US012515208B2

(12) United States Patent
Mueller et al.

(10) Patent No.: US 12,515,208 B2
(45) Date of Patent: Jan. 6, 2026

(54) DIESEL OXIDATION CATALYST

(71) Applicant: UMICORE AG & CO. KG, Hanau-Wolfgang (DE)

(72) Inventors: Elena Mueller, Pfungstadt (DE); Gordon Keitl, Frankfurt (DE); Wulf Hauptmann, Gelnhausen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 651 days.

(21) Appl. No.: 17/772,316

(22) PCT Filed: Oct. 30, 2020

(86) PCT No.: PCT/EP2020/080482
§ 371 (c)(1),
(2) Date: Apr. 27, 2022

(87) PCT Pub. No.: WO2021/084054
PCT Pub. Date: May 6, 2021

(65) Prior Publication Data
US 2022/0379293 A1    Dec. 1, 2022

(30) Foreign Application Priority Data

Oct. 30, 2019    (EP) ..................................... 19206122

(51) Int. Cl.
*B01D 53/94*        (2006.01)
*B01J 21/12*        (2006.01)
(Continued)

(52) U.S. Cl.
CPC ............ *B01J 35/19* (2024.01); *B01D 53/944* (2013.01); *B01J 21/12* (2013.01); *B01J 23/10* (2013.01);
(Continued)

(58) Field of Classification Search
CPC .......... B01D 53/944; B01D 2255/1021; B01D 2255/1023; B01D 2255/204;
(Continued)

(56) References Cited

U.S. PATENT DOCUMENTS 6,602,820 B1    8/2003    Göbel
8,668,877 B2    3/2014    Wei et al.
(Continued)

FOREIGN PATENT DOCUMENTS

CN    102387856 A    3/2012
CN    103313787 A    9/2013
(Continued)

OTHER PUBLICATIONS

Zhu, Huaqing, et al. Low-temperature oxidation of CO over $Pd/CeO_2$—$TiO_2$ catalysts with different pretreatments. Journal of Catalysis. 2005. vol. 233, pp. 41-50.
(Continued)

*Primary Examiner* — Dapinder Singh
(74) *Attorney, Agent, or Firm* — Smith, Gambrelll & Russell, LLP

(57) ABSTRACT

The present invention relates to a diesel oxidation catalyst comprising a carrier body having a length L extending between a first end face and a second end face, and differently composed material zones A and B arranged on the carrier body, wherein
material zone A comprises platinum and palladium applied to a cerium-titanium mixed oxide, and
material zone B comprises platinum and palladium applied to a carrier oxide B.

20 Claims, 2 Drawing Sheets

(51) Int. Cl.

| | |
|---|---|
| *B01J 23/10* | (2006.01) |
| *B01J 23/44* | (2006.01) |
| *B01J 29/74* | (2006.01) |
| *B01J 35/00* | (2006.01) |
| *B01J 35/56* | (2024.01) |
| *F01N 3/28* | (2006.01) |

(52) U.S. Cl.
CPC ........... *B01J 23/44* (2013.01); *B01J 29/7415* (2013.01); *B01J 35/56* (2024.01); *F01N 3/2803* (2013.01); *B01D 2255/1021* (2013.01); *B01D 2255/1023* (2013.01); *B01D 2255/2063* (2013.01); *B01D 2255/2065* (2013.01); *B01D 2255/20707* (2013.01); *B01D 2255/2092* (2013.01); *B01D 2255/30* (2013.01); *B01D 2255/40* (2013.01); *B01D 2255/502* (2013.01); *B01D 2255/9022* (2013.01); *B01D 2255/9032* (2013.01); *B01D 2255/9035* (2013.01); *B01D 2255/909* (2013.01); *F01N 2370/02* (2013.01)

(58) Field of Classification Search
CPC .... B01D 2255/2042; B01D 2255/2047; B01D 2255/2063; B01D 2255/2065; B01D 2255/20707; B01D 2255/2092; B01D 2255/30; B01D 2255/40; B01D 2255/502; B01D 2255/9022; B01D 2255/9032; B01D 2255/9035; B01D 2255/909; B01J 21/063; B01J 21/12; B01J 23/002; B01J 23/10; B01J 23/42; B01J 23/44; B01J 23/63; B01J 29/7007; B01J 29/7415; B01J 35/19; B01J 35/56; B01J 37/0228; B01J 37/024; B01J 37/0244; B01J 37/0246; B01J 37/0248; B01J 37/038; F01N 3/2803; F01N 3/28; F01N 3/103; F01N 3/2825; F01N 3/2828; F01N 2370/02; F01N 2330/06; F01N 2330/02; Y02A 50/20; Y02T 10/12

See application file for complete search history.

(56) References Cited

U.S. PATENT DOCUMENTS

| | | | |
|---|---|---|---|
| 8,753,999 | B2 | 6/2014 | Endruschat et al. |
| 9,011,783 | B2 | 4/2015 | Schuetze |
| 9,757,712 | B2* | 9/2017 | Hoyer .................. B01J 37/0234 |
| 9,764,310 | B2 | 9/2017 | Markatou et al. |
| 10,213,767 | B2 | 2/2019 | Reith et al. |
| 10,286,359 | B2 | 5/2019 | Chiffey et al. |
| 10,328,388 | B2 | 6/2019 | Dumbuya et al. |
| 10,449,518 | B2 | 10/2019 | Markatou et al. |
| 10,767,528 | B2 | 9/2020 | Hengst |
| 10,843,171 | B2 | 11/2020 | Markatou et al. |
| 11,439,952 | B2* | 9/2022 | Mueller ................. F01N 3/2803 |
| 2008/0045405 | A1 | 2/2008 | Beutel |
| 2010/0183490 | A1 | 7/2010 | Hoke et al. |
| 2010/0257843 | A1 | 10/2010 | Hoke |
| 2011/0099975 | A1 | 5/2011 | Bailey |
| 2012/0111768 | A1* | 5/2012 | Elsen ..................... C10G 49/02 502/352 |
| 2012/0129681 | A1* | 5/2012 | Adib ...................... C01G 25/02 977/775 |
| 2014/0030158 | A1 | 1/2014 | Takagi |
| 2015/0151282 | A1* | 6/2015 | Nagata .................... B01J 35/23 502/330 |
| 2016/0339389 | A1* | 11/2016 | Hoke .................... F01N 3/2807 |
| 2019/0162095 | A1* | 5/2019 | Hengst .................... F01N 3/035 |
| 2020/0032687 | A1* | 1/2020 | Utschig ................. B01J 37/038 |
| 2020/0378286 | A1* | 12/2020 | Hengst ............... B01D 53/9472 |

FOREIGN PATENT DOCUMENTS

| | | |
|---|---|---|
| CN | 105636673 A | 6/2016 |
| CN | 105813716 A | 7/2016 |
| CN | 105879869 A | 8/2016 |
| CN | 108136373 A | 6/2018 |
| CN | 109475843 A | 3/2019 |
| CN | 110191751 A | 8/2019 |
| EP | 1 101 528 A2 | 5/2001 |
| EP | 2 000 639 A1 | 12/2008 |
| JP | 2010-017707 A | 1/2010 |
| JP | 2017-505226 A | 2/2017 |
| WO | 2010/083355 A2 | 7/2010 |
| WO | 2010/133309 A1 | 11/2010 |
| WO | 2011/057649 A1 | 5/2011 |
| WO | 2013/042080 A1 | 3/2012 |
| WO | 2012/071421 A2 | 5/2012 |
| WO | 2012/079598 A1 | 6/2012 |
| WO | 2012/137930 A1 | 10/2012 |
| WO | 2013/050784 A2 | 4/2013 |
| WO | 2015/031611 A1 | 3/2015 |

OTHER PUBLICATIONS

Zhu, Huaqing, et al. CO oxidation at low temperature over Pd supported on $CeO_2$—$TiO_2$ composite oxide. Catalysis Today. 2007. vol. 126, pp. 382-386.
Third Office Action dated Mar. 1, 2024 for Chinese Patent Application No. 202080056964.1 (14 pages in Chinese; 8 pages English translation).
International Search Report for PCT/EP2020/080482, dated Jan. 14, 2021 (4 pgs.).
Written Opinion of the International Searching Authority for PCT/EP2020/080482, dated Jan. 14, 2021 (6 pgs.).
P. Li et al, Ce—Ti Amorphous Oxides for Selective Catalytic Reduction of NO with $NH_3$: Confirmation of Ce—O—Ti Active Sites, Environmental Science & Technology 2012, American Chemical Society pp. 9600-9605.
First Office Action and Search Report dated Apr. 25, 2022 for Chinese Patent Application No. 202080056964.1 (9 pages in Chinese; 7 pages English Translation).
Second Office Action and Search Report dated Oct. 27, 2023 for Chinese Patent Application No. 202080056964.1 (12 pages in Chinese; 11 pages English Translation).
Extended European Search Report Mailed Apr. 14, 2020 for European Patent Application No. 19206122.4 (6 pages).
International Preliminary Report on Patentability mailed May 3, 2022 for International Patent Application No. PCT/EP2020/080482 (6 pages).
Office Action dated Dec. 2, 2024 for Japanese Patent Application No. 2022-514769 (3 pages in Japanese; 4 pages English translation).
Examination Report dated May 29, 2025 for Indian Patent Application No. 202247024550 (7 pages).

* cited by examiner

DIESEL OXIDATION CATALYST

The present invention relates to an oxidation catalyst for purifying the exhaust gases of diesel engines.

In addition to carbon monoxide CO, hydrocarbons HC and nitrogen oxides $NO_x$, the raw exhaust of diesel engines contains a relatively high oxygen content of up to 15% by volume. Additionally, particulate emissions are included which predominantly consist of soot residues and in some cases organic agglomerates and result from a partially incomplete combustion of fuel in the cylinder.

While diesel particulate filters with and without catalytically active coating are suitable for removing the particulate emissions, and nitrogen oxides can be converted to nitrogen, for example, by selective catalytic reduction (SCR) in a so-called SCR catalyst, carbon monoxide and hydrocarbons are rendered harmless by oxidation in a suitable oxidation catalyst.

Oxidation catalysts are extensively described in the literature. These are, for example, so-called flow-through substrates made of ceramic or metal material, which carry as essential catalytically active constituent noble metals, such as platinum and palladium, on high-surface-area, porous, high-melting-point oxides, for example, aluminum oxide. Already zoned oxidation catalysts are also described which have, in the direction of flow of the exhaust gas, material zones of different composition, with which the exhaust gas comes into contact in succession.

For example, US2010/257843, US2011/099975, and WO2012/079598 A1 describe zoned oxidation catalysts which contain platinum and palladium. WO2011/057649 A1 also describes oxidation catalysts, wherein they can be used in layered and zoned embodiments. In the case of the zoned embodiments, the second zone, i.e. the zone with which the outflowing exhaust gas is in direct contact, has a higher noble metal content than the front zone, which is in direct contact with the incoming exhaust gas. The oxidation catalysts according to WO2011/057649 have the particular task of setting an optimum ratio of NO to $NO_2$ for an SCR catalyst on the outflow side.

Further oxidation catalysts are disclosed in WO2010/133309 A1, WO2013/050784 A2, US2008/045405, WO2012/137930 A1 and WO2012/071421 A2.

EP2000639A1 describes oxidation catalysts which contain, in addition to platinum, an oxide of a metal selected from magnesium, alkaline earth metal and alkali metal. The function of the catalyst is to increase the exhaust gas temperature during fuel injection. WO2010/083355A2 discloses diesel oxidation catalysts which comprise a first washcoat layer which comprises palladium and a first refractory metal oxide support including cerium and a second washcoat layer comprising a second refractory oxide support and a platinum component. The second washcoat layer is substantially free of palladium and comprises a molecular sieve.

WO2013/042080A1 discloses a layered diesel oxidation catalyst which comprises in a first layer palladium impregnated on a support material comprising ceria in an amount of at least 45 weight-%.

WO2015/031611A1 discloses a CO-slip catalyst which comprises palladium and a ceria-containing material, which for example can be ceria, ceria-zirconia, ceria-zirconia-alumina or mixtures thereof.

US2019/162095 pertains to a diesel oxidation catalyst which comprises a carrier body and three catalytically active zones A, B and C. Zone A contains palladium or platinum and palladium in a weight ratio Pt:Pd of ≤1, zone B comprises cerium oxide and is free of platinum and zone C contains platinum or platinum and palladium in a weight ratio Pt:Pd of a ≥5.

US2016/339389 claims an oxidation catalyst comprising a carrier substrate, a first and a second washcoat layer. The first washcoat layer comprises palladium supported by a first refractory metal oxide support which includes cerium and can in addition contain titania and is substantially free of i.a. platinum. The second washcoat layer comprises a second refractory support and a platinum component and is substantially free of i.a. palladium.

Catalysis Today 126 (2007) 382-386 and Journal of Catalysis 233 (2005) 41-50, both deal with CO oxidation at low temperature over Pd supported on $CeO_2$—$TiO_2$ composite oxide.

Environmental Science & Technology, vol. 46, no. 17, pages 9600-9605 discloses Ce—Ti amorphous oxides for selective catalytic reduction of NO with $NH_3$.

The exhaust gas temperatures of current and future diesel engines of Exhaust Legislation Euro 5, 6 and 6+ are getting increasingly lower due to fuel savings for lowering the $CO_2$ output. It is all the more important to have diesel oxidation catalysts which have a sufficient CO light off at low exhaust gas temperatures. At the same time the catalysts must oxidize hydrocarbons to a sufficient extent as well. The diesel oxidation catalysts known to date do not fulfill this condition sufficiently, so that there is a need for a corresponding further development.

It has now been found that the diesel oxidation catalysts described and defined below meet these conditions.

Figure 1:
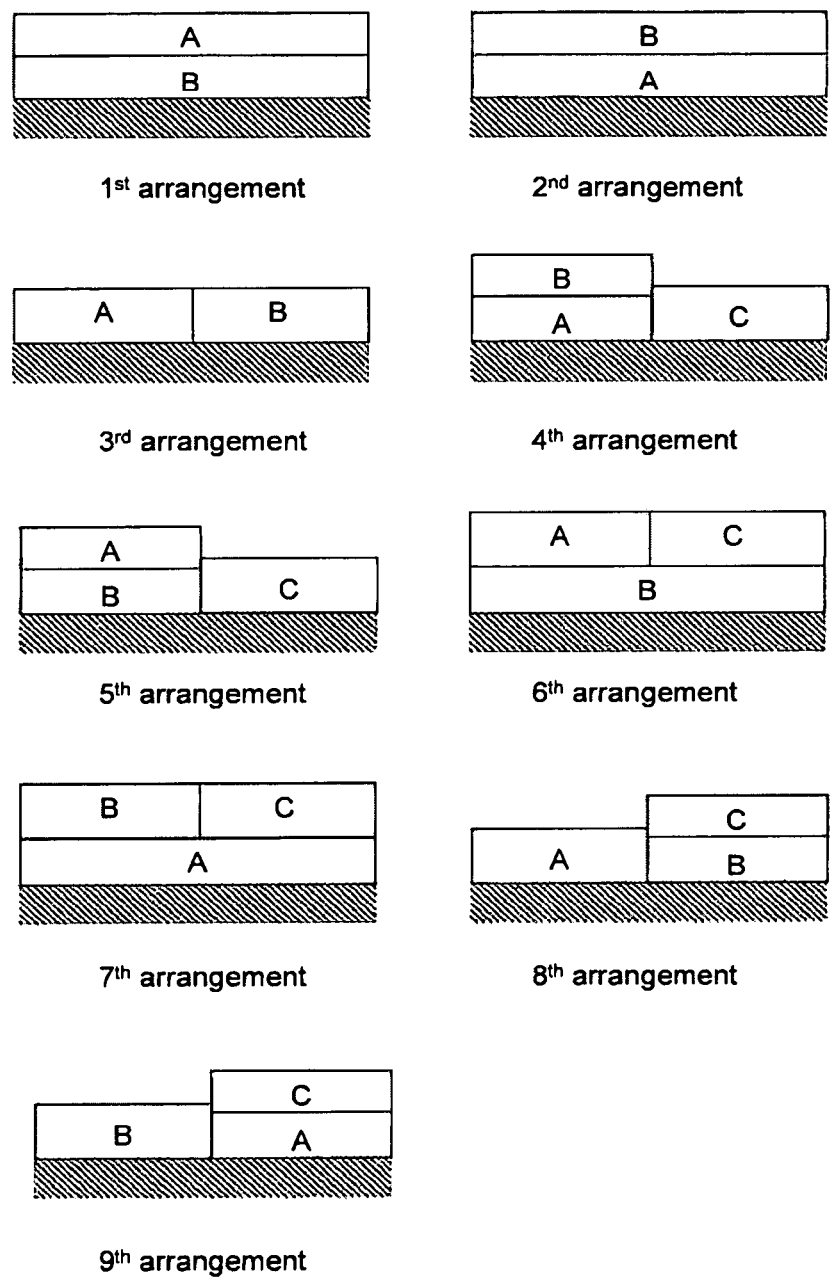
FIG. 1 shows material zone arrangements.

The present invention relates to a diesel oxidation catalyst comprising a carrier body having a length L extending between a first end face and a second end face, and differently composed material zones A and B arranged on the carrier body, wherein material zone A comprises platinum and palladium applied to a cerium-titanium mixed oxide, and material zone B comprises platinum and palladium applied to a carrier oxide B.

Material zone A preferably comprises platinum and palladium in a weight ratio of 3:1 to 1:50, for example 2:1 to 1:20 or 1:1 to 1:10.

Material zone A may in addition comprise rhodium.

Material zone A preferably comprises platinum and palladium and optionally rhodium in an amount of 0.18 to 3.53 g/L based on the volume of the carrier body.

In material zone A platinum and palladium and optionally rhodium are applied to a cerium-titanium mixed oxide. In the context of the present application the term "cerium-titanium mixed oxide" excludes physical mixtures of cerium oxide and titanium oxide. Rather, the term stands for a solid solution with a uniform crystal lattice in which the individual metal oxides cannot be distinguished. Or it stands for agglomerates comprising cerium oxide and titanium oxide which do not have a uniform crystal lattice and in which phases of the individual metal oxides can be distinguished.

Preferably, the cerium-titanium mixed oxide comprises 20 to 98% by weight of cerium oxide and 80 to 2% by weight of titanium oxide. More preferably, the cerium-titanium mixed oxide comprises 25 to 95% by weight of cerium oxide and 75 to 5% by weight of titanium oxide.

Usually, material zone A comprises cerium-titanium mixed oxide in an amount of 20 to 140 g/L based on the volume of the carrier body.

Preferably, material zone A is free of barium and barium oxide.

Material zone B preferably comprises platinum and palladium in a weight ratio of 10:1 to 1:3, for example 5:1 to 1:1.

Material zone B preferably comprises platinum and palladium in an amount of 0.73 to 6.36 g/L based on the volume of the carrier body.

Carrier oxide B is advantageously high-melting, i.e. its melting point is at a sufficient distance above the temperatures occurring during the intended operation of the oxidation catalyst according to the invention. Carrier oxide B is also advantageously of high surface area and preferably has specific surfaces of 50 to 200 m²/g.

Carrier oxide B is in particular selected from the group consisting of aluminum oxide, doped aluminum oxide, silicon oxide, titanium dioxide, zirconium oxide and mixed oxides of one or more thereof.

Doped aluminum oxides are, for example, aluminum oxides doped with silicon oxide, zirconium oxide and/or titanium oxide. Lanthanum-doped aluminum oxide is advantageously used, wherein lanthanum is used in amounts of from 1 to 10% by weight, preferably from 3 to 6% by weight, each calculated as $La_2O_3$ and relative to the weight of the stabilized aluminum oxide.

Preferably, carrier oxide B is aluminum oxide or lanthanum-stabilized aluminum oxide. Usually, material zone B comprises carrier oxide B in an amount of 10 to 160 g/L based on the volume of the carrier body.

In an embodiment of the oxidation catalyst according to the present invention, material zone B comprises lanthanum oxide, magnesium oxide, barium oxide and/or strontium oxide, in particular in an amount of 0.5 to 8 g/L based on the volume of the carrier body. Lanthanum oxide is preferred.

In another embodiment of the oxidation catalyst according to the present invention, material zone B comprises a hydrocarbon adsorbent material which is for example a zeolite. Preferably, the hydrocarbon adsorbent material is a beta zeolite.

In still another embodiment of the oxidation catalyst according to the present invention, the carrier body comprises a material zone C, which is different from material zones A and B and which comprises platinum, palladium or platinum and palladium applied to a carrier oxide C.

Preferably, material zone C comprises platinum or platinum and palladium in a weight ratio ≥1, for example 20:1 to 10:1.

Material zone C preferably comprises platinum, palladium or platinum and palladium in an amount of 1.06 to 7.06 g/L based on the volume of the carrier body.

Carrier oxide C is advantageously high-melting, i.e. its melting point is at a sufficient distance above the temperatures occurring during the intended operation of the oxidation catalyst according to the invention. Carrier oxide C is also advantageously of high surface area and preferably has specific surfaces of 50 to 200 m²/g.

Carrier oxide C is in particular selected from the group consisting of aluminum oxide, doped aluminum oxide, silicon oxide, zirconium oxide, titanium dioxide and mixed oxides of one or more thereof.

Doped aluminum oxides are, for example, aluminum oxides doped with silicon oxide, zirconium oxide and/or titanium oxide. Lanthanum-stabilized aluminum oxide is advantageously used, wherein lanthanum is used in amounts of from 1 to 10% by weight, preferably from 3 to 6% by weight, each calculated as $La_2O_3$ and relative to the weight of the stabilized aluminum oxide.

Preferably, carrier oxide C is aluminum oxide doped with silica in a total amount of 1 to 20% by weight based on the weight of the carrier oxide C.

Usually, material zone C comprises carrier oxide C in an amount of 30 to 180 g/L based on the volume of the carrier body.

In a particularly preferred embodiment, the present invention relates to a diesel oxidation catalyst comprising a carrier body having a length L extending between a first end face and a second end face, and differently composed material zones A, B and C arranged on the carrier body, wherein material zone A comprises platinum and palladium in a weight ratio of 1:1 to 1:10 applied to a cerium-titanium mixed oxide comprising 25 to 95% by weight of cerium oxide and 75 to 5% by weight of titanium oxide, material zone B comprises platinum and palladium in a weight ratio of 5:1 to 1:1 applied to aluminum oxide or lanthanum-stabilized aluminum oxide, and material zone C comprising platinum and/or palladium applied to aluminum oxide doped with 1 to 20% by weight of silica based on the doped aluminum oxide.

Carrier bodies are particularly so-called honeycomb bodies made of ceramic, preferably cordierite, or of metal. So-called flow-through honeycomb bodies are preferably used. However, embodiments are also conceivable in which wall-flow filters are used as carrier bodies.

Material zones A and B and if present material zone C can be arranged on the carrier body in different arrangements, see FIG. 1.

In a first arrangement, the oxidation catalyst of the present invention comprises material zones A and B which both extend over the complete length L of the carrier body, wherein material zone B is located below material zone A.

In a second arrangement, the oxidation catalyst of the present invention comprises material zones A and B which both extend over the complete length L of the carrier body, wherein material zone A is located below material zone B.

In a third arrangement, the oxidation catalyst of the present invention comprises material zones A and B, wherein material zone A extends starting from the first end face over 20 to 80% of the length L and material zone B extends starting from the second end face over 20 to 80% of the length L. In preferred embodiment of the third arrangement material zones A and B both extend over 40 to 60%, more preferred 50% of the length L.

In a forth arrangement, the oxidation catalyst of the present invention comprises material zones A, B and C, wherein material zones A and B both extend starting from the first end face over 40 to 60% of the length L wherein material zone A is located below material zone B and material zone C extends from the second end face over 40 to 60% of the length L, wherein $L=L_A+L_C$, wherein $L_A$ is the length of material zone A, $L_C$ is the length of the material zone C and material zone B has the same length as material zone A.

In a fifth arrangement, the oxidation catalyst of the present invention comprises material zones A, B and C, wherein material zones A and B both extend starting from the first end face over 40 to 60% of the length L wherein material zone B is located below material zone A and material zone C extends from the second end face over 40 to 60% of the length L, wherein $L=L_A+L_C$, wherein $L_A$ is the length of material zone A, $L_C$ is the length of the material zone C and material zone B has the same length as material zone A.

In a sixth arrangement, the oxidation catalyst of the present invention comprises material zones A, B and C, wherein material zones A extends starting from the first end face over 40 to 60% of the length L, material zone C extends starting from the second end face over 40 to 60% of the length L and material zone B extends over the complete length L and is located below material zones A and C and wherein $L=L_A+L_C$, wherein $L_A$ is the length of material zone A, $L_C$ is the length of the material zone C.

In a seventh arrangement, the oxidation catalyst of the present invention comprises material zones A, B and C, wherein material zones B extends starting from the first end face over 40 to 60% of the length L, material zone C extends starting from the second end face over 40 to 60% of the length L and material zone A extends over the complete length L and is located below material zones B and C and wherein $L=L_B+L_C$, wherein $L_B$ is the length of material zone B, $L_C$ is the length of the material zone C.

In an eighth arrangement, the oxidation catalyst of the present invention comprises material zones A, B and C, wherein material zones B and C both extend starting from the second end face over 40 to 60% of the length L wherein material zone B is located below material zone C and material zone A extends starting from the first end face over 40 to 60% of the length L, wherein $L=L_A+L_C$, wherein $L_A$ is the length of material zone A, $L_C$ is the length of the material zone C and material zone B has the same length as material zone C.

In a ninth arrangement, the oxidation catalyst of the present invention comprises material zones A, B and C, wherein material zones A and C both extend starting from the second end face over 40 to 60% of the length L wherein material zone A is located below material zone C and material zone B extends starting from the first end face over 40 to 60% of the length L, wherein $L=L_B+L_C$, wherein $L_B$ is the length of material zone B, $L_C$ is the length of the material zone C and material zone A has the same length as material zone C.

Oxidation catalysts according to the invention can be produced by coating suitable carrier bodies in a manner known per se by means of coating suspensions, so-called washcoats. To produce a coating suspension for producing the material zones A, B and C, respectively, the selected carrier oxides are suspended in water. Platinum and/or palladium and/or rhodium are then added while stirring to the suspension in the form of suitable, water-soluble precursor compounds, such as palladium nitrate or hexahydroxoplatinic acid, for example, and optionally fixed on the carrier material by setting the pH and/or by adding an auxiliary reagent.

Alternatively, the noble metal may also be applied to the carrier material in a manner analogous to the method described in EP1101528A2.

The suspensions obtained in this way are then ground and applied to the carrier body by one of the standard coating methods. After each coating step, the coated part is dried in a hot air stream and in some cases calcined.

The aforementioned precursors and auxiliary reagents are well known to those skilled in the art.

The diesel oxidation catalysts according to the invention are suitable for purifying the exhaust gases of diesel engines, in particular with regard to carbon monoxide and hydrocarbons.

The present invention thus also relates to a method for the treatment of diesel exhaust gases, which is characterized in that the diesel exhaust gas is conducted through a diesel oxidation catalyst as described and defined above, wherein the diesel exhaust gas flows into the carrier body at the first end face and flows out of the carrier body at the second end face.

The diesel oxidation catalysts according to the invention are used in particular as constituents of exhaust gas purification systems. In addition to a diesel oxidation catalyst according to the invention, corresponding exhaust gas purification systems include, for example, a diesel particulate filter and/or a catalyst for selective catalytic reduction of nitrogen oxides, wherein the diesel particulate filter and SCR catalyst are usually arranged downstream of the diesel oxidation catalyst according to the invention, that is on the outflow side. In one embodiment of the emission control system, the SCR catalyst is arranged on the diesel particulate filter.

EXAMPLE 1 a) 60 g/l of milled CeTiOx material ($CeO_2/TiO_2$=95/5) were added to a solution of soluble Pt salt (0.35315 g/l Pt), followed by 1.05944 g/l of Pd ex nitrate. Finally, 4.5 g/L of alumina-sol were added. The obtained product was dried and calcined for 2 h at 550° C.

b) A commercially available round flow-through substrate of cordierite having the dimensions 14.4 cm×7.6 cm (5.66"× 3.00") with cell density 62 cpcm (400 cpsi) and wall thickness 102 μm (4.0 mils) was coated over its complete length with a washcoat containing 66 g/l of the product obtained according to a) above.

c) To 66.165 g/l of a milled powder comprising 2.5897 g/l Pt, and 1.2949 g/l Pd fixed on 100 g/l of alumina, 3.18 g/l of $La_2O_3$ and 25.48 g/l of beta zeolite were added. The powder was calcined for 2 h at 550° C.

d) The coated substrate obtained according to b) above was coated over its complete length with a washcoat containing 94 g/l of the product obtained according to c) above. The oxidation catalyst obtained corresponds to arrangement 2 mentioned above and is called C1 below.

COMPARISON EXAMPLE 1

Steps a) and b) of Example 1 were repeated with the exception that in step a) 100 g/l of milled CeTiOx material ($CeO_2/TiO_2$=95/5) were added to a solution of soluble Pt salt (0.9712 g/l Pt), followed by 2.9135 g/l of Pd ex nitrate.

The oxidation catalyst obtained is called CC1 below.

COMPARISON EXAMPLE 2 a) To 103.88 g/l of a milled powder comprising 2.5897 g/l Pt, and 1.2949 g/l Pd fixed on 100 g/l of alumina), 5 g/l of $La_2O_3$ and 40 g/l of beta zeolite were added. The powder was calcined for 2 h at 550° C.

b) A commercially available round flow-through substrate of cordierite having the dimensions 14.4 cm×7.6 cm (5.66"× 3.00") with cell density 62 cpcm (400 cpsi) and wall thickness 102 μm (4.0 mils) was coated over its complete length with a washcoat containing 148 g/l of the product obtained according to a) above.

The oxidation catalyst obtained is called CC2 below.

EXAMPLE 2 a) 42 g/l of milled CeTiOx material ($CeO_2/TiO_2$=95/5) were added to a solution of soluble Pt salt (1.059 g/l Pt), followed by 1.059 g/l of Pd ex nitrate. Finally, 18 g/l of milled alumina and then 4.5 g/L of Alumina-sol were added. The obtained product was dried and calcined for 2 h at 550° C.

b) A commercially available round flow-through substrate of cordierite having the dimensions 14.4 cm×7.6 cm (5.66"×3.00") with cell density 62 cpcm (400 cpsi) and wall thickness 102 μm (4.0 mils) was coated starting from its first end face over 50% of its length with a washcoat containing 67 g/l of the product obtained according to a) above.

c) 50 g/l of milled alumina were added to a solution of a Pt salt (0.942 g/l Pt). Subsequently, 0.471 g/l Pd ex nitrate, 3 g/l of $La_2O_3$, 30 g/l beta zeolite and 4.5 g/l of alumna-sol were added. The product obtained was dried and calcined for 2 h at 550° C.

d) The coated substrate obtained according to b) above was coated starting from its first end face over 50% of its length with a washcoat containing 89 g/l of the product obtained according to c) above.

e) 150 g/l of alumina doped with 10% by weight of silica were added to a solution containing 2.608 g/l of Pt and 0.217 g/l of Pd (both in form of their nitrates). The product obtained was dried and calcined for 2 h at 550° C.

f) The coated substrate obtained according to d) above was coated starting from its second end face over 50% of its length with a washcoat containing 150 g/l of the product obtained according to e) above.

The oxidation catalyst obtained corresponds to arrangement 4 mentioned above and is called C2 below.

EXAMPLE 3

Example 2 above was repeated with the exception that the substrate was first coated with a washcoat containing the product obtained according to step c) of Example 2 and subsequently with a washcoat containing the product obtained according to step a) of Example 2.

The oxidation catalyst obtained corresponds to arrangement 5 mentioned above and is called C3 below.

EXAMPLE 4 a) A commercially available round flow-through substrate of cordierite having the dimensions 14.4 cm×7.6 cm (5.66"×3.00") with cell density 62 cpcm (400 cpsi) and wall thickness 102 μm (4.0 mils) was coated over its complete with a washcoat containing 89 g/l of the product obtained according to step c) of Example 2.

b) The coated substrate obtained according to a) above was coated starting from its first end face over 50% of its length with a washcoat containing 67 g/l of the product obtained according to step a) of Example 2.

c) 100 g/l of alumina doped with 10% by weight of silica were added to a solution containing 1.304 g/l of Pt and 0.109 g/l of Pd (both in form of their nitrates). The product obtained was dried and calcined for 2 h at 550° C.

d) The coated substrate obtained according to b) above was coated starting from its second end face over 50% of its length with a washcoat containing 102 g/l of the product obtained according to c) above.

The oxidation catalyst obtained corresponds to arrangement 6 mentioned above and is called C4 below.

EXAMPLE 5 a) 84 g/l of milled CeTiOx material ($CeO_2/TiO_2$=95/5) were added to a solution of soluble Pt salt (1.413 g/l Pt), followed by 1.413 g/l of Pd ex nitrate. Finally, 36 g/l of milled alumina and then 9 g/L of Alumina-sol were added. The obtained product was dried and calcined for 2 h at 550° C.

b) A commercially available round flow-through substrate of cordierite having the dimensions 14.4 cm×7.6 cm (5.66"×3.00") with cell density 62 cpcm (400 cpsi) and wall thickness 102 μm (4.0 mils) was coated starting from its first end face over 50% of its length with a washcoat containing 134 g/l of the product obtained according to a) above.

c) The coated substrate obtained according to b) above was coated starting from its second end face over 50% of its length with a washcoat containing 66.8 g/l of the product obtained according to step c) of Example 2.

d) 100 g/l of alumina doped with 10% by weight of silica were added to a solution containing 2.282 g/l of Pt and 0.109 g/l of Pd (both in form of their nitrates). The product obtained was dried and calcined for 2 h at 550° C.

e) The coated substrate obtained according to c) above was coated starting from its second end face over 50% of its length with a washcoat containing 102 g/l of the product obtained according to d) above.

The oxidation catalyst obtained corresponds to arrangement 8 mentioned above and is called C5 below.

EXAMPLE 6 a) 84 g/l of milled CeTiOx material ($CeO_2/TiO_2$=95/5) were added to a solution of soluble Pt salt (1.413 g/l Pt), followed by 1.413 g/l of Pd ex nitrate. Finally, 36 g/l of alumina and 9 g/L of Alumina-sol were added. The obtained product was dried and calcined for 2 h at 550° C.

b) A commercially available round flow-through substrate of cordierite having the dimensions 14.4 cm×7.6 cm (5.66"×3.00") with cell density 62 cpcm (400 cpsi) and wall thickness 102 μm (4.0 mils) was coated over its complete length with a washcoat containing 66 g/l of the product obtained according to a) above.

c) The coated substrate obtained according to b) above was coated starting from its first end face over 50% of its length with a washcoat containing 66.8 g/l of the product obtained according to step c) of Example 2.

d) The coated substrate obtained according to c) above was coated starting from its second end face over 50% of its length with a washcoat containing 102 g/l of the product obtained according to step d) of Example 5.

The oxidation catalyst obtained corresponds to arrangement 7 mentioned above and is called C6 below.

Comparative Experiments a) Cores were taken out of catalysts C1 to C6, CC1 and CC2. All cores were aged 16 h at 800° C. under hydrothermal atmosphere.

b) $T_{50}CO$— and $T_{50}C_3H_6$-light off values of all catalysts were determined on a synthetic gas bench with a gas mixture given in Tab 1. Before testing catalysts were preconditioned under the same gas atmosphere at 650° C.

TABLE 1

Figure 2:
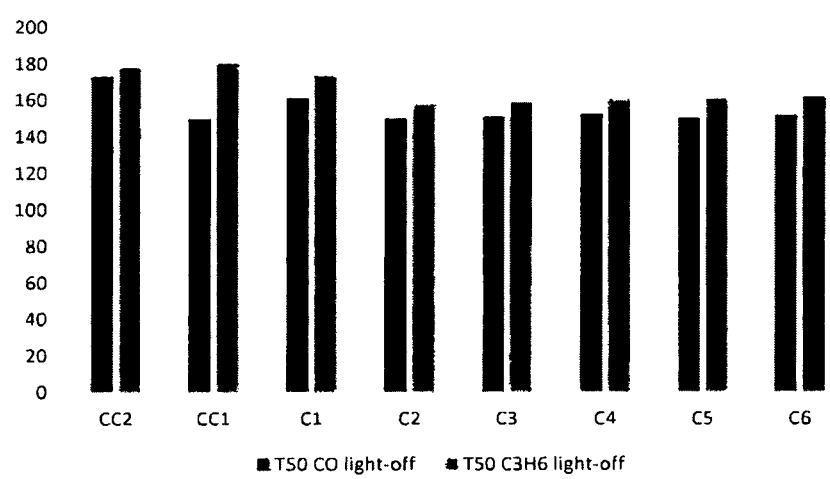
FIG. 2 shows $T_{50}CO$- and $T_{50}C_3H_6$-light off values for the catalysts.

| | |
|---|---|
| GHSV [1/h] | 60000 |
| NO [ppm] | 500 |
| $O_2$ [vol %] | 10.5 |
| CO [ppm] | 800 |
| HC [ppm C3] ($C_3H_6$) | 130 |
| $CO_2$ [vol %] | 6.3 |
| $H_2O$ [vol %] | 7 |
| $N_2$ | rest | c) The results obtained are given in FIG. 2.

Additional Experiments

A. Catalysts C7 to C10 were produced by coating washcoats on usual commercially available flow-through substrates via a usual coating technique. All catalysts contained 110 g/ft$^3$ of platinum and/or palladium on alumina and the washcoat loading was 110 g/l in each case. The catalysts differed as follows:

C7 contained platinum only
C8 contained platinum and palladium in a weight ratio Pt:Pd of 2:1
C9 contained platinum and palladium in a weight ratio Pt:Pd of 1:3
C10 contained palladium only Platinum was applied as solution of a soluble Pt salt and palladium ex nitrate.

B. Catalysts C11 to C14 were produced by coating washcoats on usual commercially available flow-through substrates via a usual coating technique. All catalysts contained 110 g/ft$^3$ of platinum and/or palladium on ceria and the washcoat loading was 110 g/l in each case. In addition, each washcoat contained 7 g/l of Alusol. The catalysts differed as follows:

C11 contained platinum only
C12 contained platinum and palladium in a weight ratio Pt:Pd of 2:1
C13 contained platinum and palladium in a weight ratio Pt:Pd of 1:3
C14 contained palladium only Platinum was applied as solution of a soluble Pt salt and palladium ex nitrate.

C. $T_{50}$CO-light off values of catalysts C7 to C14 in fresh and aged (16 h at 800° C. under hydrothermal atmosphere) condition were determined on a synthetic gas bench with a gas mixture given in Tab 2. Before testing catalysts were preconditioned under the same gas atmosphere at 500° C.

TABLE 2

| GHSV [1/h] | 50000 |
|---|---|
| NO [ppm] | 50 |
| NO$_2$ [ppm] | 50 |
| O$_2$ [vol %] | 5 |
| CO [ppm] | 1000 |
| HC [ppm C3] (C$_3$H$_6$/C$_3$H$_8$)) | 150 (75/75) |
| CO$_2$ [vol %] | 10 |
| H$_2$O [vol %] | 6.6 |
| N$_2$ | rest |

The results are given in Table 3

| | $T_{50}$CO-light off [° C.], fresh | $T_{50}$CO-light off [° C.], aged |
|---|---|---|
| C7 | 173.9 | 195.9 |
| C8 | 139.6 | 165.9 |
| C9 | 171.1 | 182.1 |
| C10 | 179.9 | 183.1 |
| C11 | 233.7 | 263.3 |
| C12 | 156.8 | 163.9 |
| C13 | 145.3 | 145.9 |
| C14 | 144.3 | 144.0 |

The invention claimed is:

1. Diesel oxidation catalyst comprising a carrier body having a length L extending between a first end face and a second end face, and differently composed material zones A and B arranged on the carrier body, wherein material zone A comprises platinum and palladium applied to a cerium-titanium mixed oxide, wherein the cerium-titanium mixed oxide of material zone A to which the platinum and palladium are applied excludes physical mixtures of cerium oxide and titanium oxide, and material zone B comprises platinum and palladium applied to a carrier oxide B.

2. Diesel oxidation catalyst according to claim 1, characterized in that material zone A comprises platinum and palladium in a weight ratio of 3:1 to 1:50.

3. Diesel oxidation catalyst according to claim 1, characterized in that the cerium-titanium mixed oxide comprises 20 to 98% by weight of cerium oxide and 80 to 2% by weight of titanium oxide.

4. Diesel oxidation catalyst according to claim 1, characterized in that material zone B comprises platinum and palladium in a weight ratio of 10:1 to 1:3.

5. Diesel oxidation catalyst according to claim 1, characterized in that carrier oxide B is selected from the group consisting of aluminum oxide, doped aluminum oxide, silicon oxide, titanium dioxide, zirconium oxide and mixed oxides of one or more thereof.

6. Diesel oxidation catalyst according to claim 1, characterized in that material zone B comprises lanthanum oxide, magnesium oxide, barium oxide and/or strontium oxide.

7. Diesel oxidation catalyst according to claim 1, characterized in that material zone B comprises a hydrocarbon adsorbent material.

8. Diesel oxidation catalyst according to claim 1, characterized in that the carrier body comprises a material zone C, which is different from material zones A and B and which comprises platinum, palladium or platinum and palladium applied to a carrier oxide C.

9. Diesel oxidation catalyst according to claim 8, characterized in that material zone C comprises platinum or platinum and palladium in a weight ratio ≥1.

10. Diesel oxidation catalyst according to claim 8, characterized in that carrier oxide C is in particular selected from the group consisting of aluminum oxide, doped aluminum oxide, silicon oxide, zirconium oxide, titanium dioxide and mixed oxides of one or more thereof.

11. Diesel oxidation catalyst according to claim 1, characterized in that material zones A and B both extend over the complete length L of the carrier body and material zone A is located below material zone B.

12. Method for treating diesel exhaust gases, characterized in that the diesel exhaust gas is conducted through a diesel oxidation catalyst according to claim 1, wherein the diesel exhaust gas flows into the carrier body at the first end face and flows out of the carrier body at the second end face.

13. Device for purification of exhaust gases from diesel engines having a diesel oxidation catalyst according to claim 1.

14. Device according to claim 13, characterized in that the diesel oxidation catalyst is arranged upstream of a diesel particulate filter and/or a catalyst for the selective catalytic reduction of nitrogen oxides.

15. Diesel oxidation catalyst according to claim 1, wherein material zone B comprises lanthanum oxide, magnesium oxide, barium oxide and/or strontium oxide in an amount of 0.5 to 8 g/L based on the volume of the carrier body.

16. Diesel oxidation catalyst according to claim 1, wherein material zone B further comprises a zeolite, and zone B extends over zone A.

17. Diesel oxidation catalyst comprising a carrier body having a length L extending between a first end face and a second end face, and differently composed material zones A and B arranged on the carrier body, wherein
- material zone A comprises platinum and palladium applied to a cerium-titanium mixed oxide, and
- material zone B comprises platinum and palladium applied to a carrier oxide B characterized in that the diesel oxidation catalyst further comprises a differently composed material zone C arranged on the carrier body, wherein
- material zone A comprises platinum and palladium in a weight ratio of 1:1 to 1:10 applied to a cerium-titanium mixed oxide comprising 25 to 95% by weight of cerium oxide and 75 to 5% by weight of titanium oxide,
- material zone B comprises platinum and palladium in a weight ratio of 5:1 to 1:1 applied to aluminum oxide or lanthanum-stabilized aluminum oxide, and
- material zone C comprising platinum and/or palladium applied to aluminum oxide doped with 1 to 20% by weight of silica based on the doped aluminum oxide.

18. Diesel oxidation catalyst comprising a carrier body having a length L extending between a first end face and a second end face, and differently composed material zones A and B arranged on the carrier body, wherein
- material zone A comprises platinum and palladium applied to a cerium-titanium mixed oxide, and
- material zone B comprises platinum and palladium applied to a carrier oxide B, wherein
  - material zone A comprises platinum and palladium in a weight ratio of 1:1 to 1:10 applied to a cerium-titanium mixed oxide comprising 25 to 95% by weight of cerium oxide and 75 to 5% by weight of titanium oxide, and
  - material zone B comprises platinum and palladium in a weight ratio of 5:1 to 1:1 applied to aluminum oxide or lanthanum-stabilized aluminum oxide.

19. Diesel oxidation catalyst according to claim 18, wherein material zone B further comprises zeolite.

20. Diesel oxidation catalyst according to claim 19, wherein the zeolite in material zone B comprises beta zeolite, and wherein zones A and B both extend over the complete length L of the carrier body with material zone A located below material zone B.

* * * * *